United States Patent [19]

Meininghaus et al.

[11] Patent Number: 5,094,529
[45] Date of Patent: Mar. 10, 1992

[54] METHOD OF DETERMINING THE END FACE POSITION OF AN OPTICAL WAVEGUIDE

[75] Inventors: Wolfgang Meininghaus, Bergisch-Gladbach; Wolfgang Tietz, Bochum, both of Fed. Rep. of Germany

[73] Assignee: U.S. Philips Corp., New York, N.Y.

[21] Appl. No.: 723,713

[22] Filed: Jun. 18, 1991

Related U.S. Application Data

[63] Continuation of Ser. No. 416,552, Oct. 3, 1989, abandoned.

[30] Foreign Application Priority Data

Oct. 6, 1988 [DE] Fed. Rep. of Germany ....... 3833970

[51] Int. Cl.$^5$ ...................... G01N 21/84; G01B 11/14
[52] U.S. Cl. ..................................... 356/73.1; 356/375
[58] Field of Search ................... 356/73.1, 375

[56] References Cited

FOREIGN PATENT DOCUMENTS 2753593 8/1978 Fed. Rep. of Germany ...... 356/394
63-222206 9/1988 Japan .................................. 356/73.1

Primary Examiner—Vincent P. McGraw
Attorney, Agent, or Firm—Ernestine C. Bartlett

[57] ABSTRACT

A method is provided for determining the end face position of an optical waveguide in a coordinate direction extending in the axial direction of the optical waveguide (1, 2) by means of a video camera via a processor. The method is simplified by means of the following steps: successive intensity values of the video signal are detected and stored by the holding unit (10) which intensity values are taken along a slit in a direction (y) which is perpendicular to the line direction (x) at the area of a coordinate position $(x_s)$; the processor converts the stored intensity values $(I_s)$ into a slit mean (averaged) intensity signal $I_m(x)$ and stores this signal; subsequently further slit signals $(I_s)$ are similarly formed and stored thereby covering an area overlying the end face of the optical waveguide (1, 2); and the position coordinates $(x_{E1}, x_{E2})$ of the end face of the optical waveguides (1, 2) is determined from the variation $I_m(x)$.

9 Claims, 1 Drawing Sheet

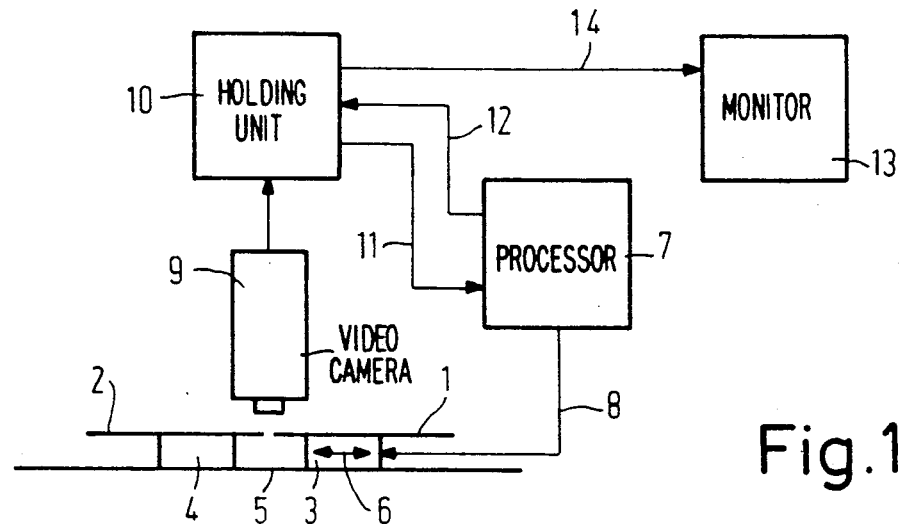
Fig.1
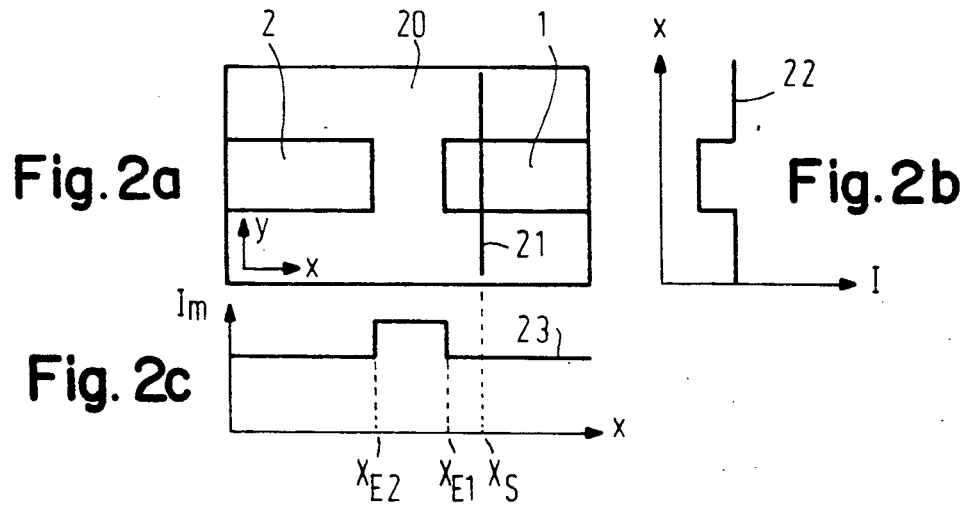
Fig.2a Fig.2b
Fig.2c
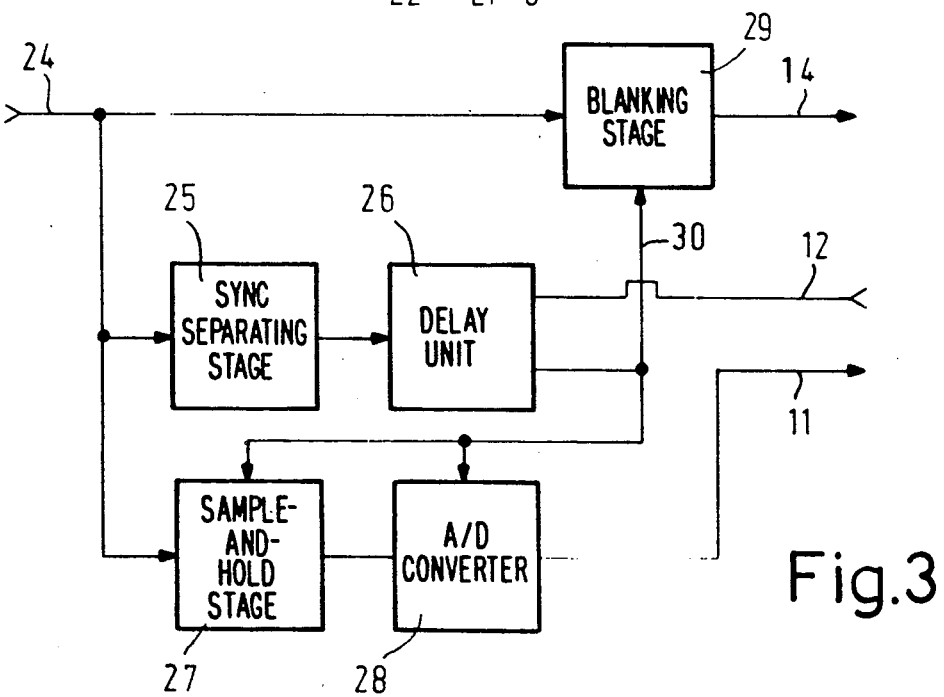
Fig.3

METHOD OF DETERMINING THE END FACE POSITION OF AN OPTICAL WAVEGUIDE

This is a continuation of application Ser. No. 07/416,552, filed Oct. 3, 1989, now abandoned.

FIELD OF THE INVENTION

The invention relates to a method of determining the end face position of an optical waveguide in a coordinate direction extending in the axial direction of the optical waveguide, comprising the following steps:

(a) the end portion of the optical waveguide is recorded by means of a video camera the line direction of which extends substantially parallel to the axial direction of the optical waveguide (b) the video signal of the video camera is evaluated in a holding unit; and (c) stored luminance information components of the video signal are applied to a processor which determines the position coordinates of the end face of the optical waveguide.

BACKGROUND OF THE INVENTION

Such a method is described in the document "Optical Fiber Fusion Splicer, SUMIOFCAS Type 34" of the firm of Sumitomo Electric.

The video camera detection of the video signal information components succeeding one another at a high frequency requires a considerable number of components for electronic circuit elements, particularly for converting the analog video signals into digital signals required for storage and for the processor. Moreover, a considerable amount of memory is required.

SUMMARY OF THE INVENTION

An object of the invention is to reduce the number of components for a method of the type described in the opening paragraph.

This object is accomplished by means of a method which comprises the following additional steps:

(d) successive intensity values of the video signal are stored by the holding unit which intensity values are taken along a slit in a direction which is perpendicular to the line direction at the area of a coordinate position;

(e) the processor converts the stored intensity values into a slit signal and stores this signal;

(f) subsequently further slit signals are similarly formed and stored thereby covering an area overlying the end face of the optical waveguide; and (g) finally, the position coordinates of the end face of the optical waveguide is determined from the variation $I_m(x)$.

The detection unit scans the signals along a slit which signals succeed each other at a relatively low line frequency. The required A/D converters may then have a much simpler construction than converters for processing the picture element frequency. After the processor has evaluated the information of a slit, the memory places which are occupied can be emptied before storing the data of the next slit so that the places are free for storing new data. Consequently, only a very small number of memory locations is required.

The method according to the invention can be used very advantageously for adjusting the distance between the end faces of two optical waveguides to be optically coupled, and in a preferred embodiment, the position coordinates $x_{E1}$ and $x_{E2}$ of the end faces of neighboring or proximately located optical waveguides are determined and the processor causes at least one of the optical waveguides to be axially displaced by means of a drive unit in such a way that a nominal distance between the end faces of the optical waveguides results.

In another preferred embodiment, the value of the slit signal increases monotonically with a mean value of the video signal values stored for a slit. For example, the slit signal is formed by integration of the intensities of the video signal via a detection gap.

Effective control of the gap coordinates of the video signals may be accomplished by an embodiment in which the coordinate of the slits is predetermined by the processor via a signal which is time-delayed with respect to the line synchrozing signal of the video signal.

The processor can suitably predetermine the geometrical distance and the time interval between neighboring slits to be detected. The time interval may be adapted to the efficiency of the electronic components used (e.g., A/D converter, memory, etc.). The geometrical distance can be increased so as to reduce the measuring time if less stringent requirements are imposed on the measuring accuracy.

A suitable and preferred circuit arrangement for determining the end face position of an optical waveguide in a coordinate direction extending in the axial direction of the optical waveguide comprises the following assemblies:

a video camera for recording the end portion of the optical waveguide;

a holding unit for evaluating the video signal;

a processor for evaluating the luminance information of the video signal to determine the position coordinate of the end face of the optical waveguide;

a delay unit for forming slit signals which are delayed with respect to the line synchronizing signals;

a sample-and-hold stage for holding the values of the video signal of a slit;

an A/D converter for converting the values of the video signal;

a memory for storing digitized values of the video signal; and a processor comprising a control circuit for initiating detection processes at different coordinate positions ($x_s$) covering an area overlying the end face of the optical waveguide and a computing circuit for determining the position coordinate of the end face of the optical waveguide.

In a preferred embodiment of the invention, the processor comprises a control circuit and a computing circuit for forming control signals for a drive means axially displacing the optical waveguide.

BRIEF DESCRIPTION OF THE DRAWINGS

The invention and its advantages will be described in greater detail by way of an advantageous embodiment shown in the drawing.

FIG. 1 shows the basic construction of a circuit arrangement according to the invention, used for adjusting the gap between two optical waveguide ends;

FIGS. 2a-2c explain how the method according to the invention is performed; and

FIG. 3 shows electronic circuit groups of a detection unit according to the invention, shown in FIG. 1.

DETAILED DESCRIPTION OF THE PREFERRED EMBODIMENTS

Two optical waveguides 1 and 2 or groups of optical waveguides of a flat tape of waveguides are clamped on holders 3 and 4 while facing each other coaxially, as is shown in FIG. 1. The holder 3 is movable in the axial direction of the optical waveguides 1 and 2 on the baseplate 5 in the direction of the double arrow 6 by means of a driving unit which is not further shown. The end faces of the optical waveguides 1 and 2 are to be contacted with each other in order that they can be fused together.

After positioning the optical waveguides 1 and 2 in their holders 3 and 4 actual data of the position coordinates of the end faces of the optical waveguides 1 and 2 must first be determined and evaluated by a processor 7 so that signals can subsequently be applied to the processor 7 via the control line 8 so as to displace the holder 3 in such a way that the distance between the end faces of the optical waveguides 1 and 2 becomes substantially "zero". A stepping motor is particularly suitable for driving the holder 3, which motor receives, via the control line 8, a number of stepping pulses corresponding to the required displacement.

A recording is made by the video camera 9 of the distance between the two optical waveguides 1 and 2 and a video signal is formed which comprises information about the luminance values of the pixels as well as synchronizing signals, particularly a line signal. According to the invention, in a manner described with reference to FIGS. 2 and 3, the holding unit 10 only stores video signal values corresponding to one slit of the recorded picture and supplies them to the processor 7 via the line 11.

The processor 7 applies command signals via the line 12 to the detection unit, which signals determine the position of a slit to be detected, namely the coordinate of a line for which the video signal is to be stored.

The monitor 13 receives the complete video signal from the video camera 9 via the line 14 and it also receives a cursor signal on which a bright or a dark signal is superimposed at the positions of the slit.

The distance between the end faces of the optical waveguides 1 and 2 is visible on the display screen 20 of the monitor 13, as is shown in FIG. 2a. With a slit coordinate $x_s$ where the cursor line 21 is visible, intensities $I_s$ of the video signal extending in the y direction in accordance with curve 22 (FIG. 2b) are detected, stored and converted to a mean signal intensity $I_m$. When displacing the coordinate $x_s$ over the range shown on display screen 20, the mean signal intensity $I_m$ along the x axis varies in accordance with curve 23 (FIG. 2c). The transistions produced at the positions $x_{E1}$ and $x_{E2}$ of the end faces of the optical waveguides 1 and 2 can be evaluated as information about the coordinates $x_{E1}$ and $x_{E2}$.

The basic construction of the holding unit 10 according to FIG. 1 is shown in FIG. 3. The line synchronizing signal in the video signal received via the line 24 is separated by means of a sync separating stage 25 and is applied to the sample-and-hold stage 27 and the A/D converter 28 in a time-delayed manner via the delay unit 26. The extent of the delay desired in accordance with the desired slit coordinate $x_s$ is given by the processor 7 (FIG. 1) via the line 12. The intensity values $I_s$ of the video signal stored at the coordinate $x_s$ by the sample-and-hold stage are converted into digital signals in the A/D converter 28 from which they are applied via the line 11 to the processor for the purpose of evaluation.

The cursor line 21 is produced by means of the blanking stage 29 in that the brightness of the incoming video signal is preferably increased at the instants corresponding to the coordinate $x_s$. The blanking stage 29 acquires the information about the correct cursor instant by means of the delayed output signal of the delay unit 26 applied via the line 30.

The present invention is described with reference to the application and manufacture of a fusion of two optical waveguides. However, the invention is similarly applicable if two optical waveguides which are in contact with each other must be displaced for the purpose of an optical coupling without a fusion. Instead of optical waveguides the distances between arbitrary similar elements can be detected and adjusted.

To speed up an adjusting process it may be efficient to limit the evaluation range by means of a manual displacement of the cursor line to an area which is possibly close to the end faces. To this end the processor should be provided with a corresponding input interface.

To speed up an adjusting process, a concurrent detection, in a way described in accordance with the invention, of the luminance information components of the video signal at a plurality of coordinates $x_s$ is also possible.

We claim:

1. A method of determining the end face position of an optical waveguide in a coordinate direction (x) extending in the axial direction of the optical waveguide (1, 2), which comprises the following steps:
   (a) recording the end portion of the optical waveguide (1, 2) by means of a video camera (9) the line direction of which extends substantially parallel to the axial direction of the optical waveguide (1, 2);
   (b) evaluating the video signal of the video camera (9) in a holding unit (10);
   (c) applying stored luminance information components of the video signal to a processor (7) which determines the position coordinates ($x_{E1}$, $x_{E2}$) of the end face of the optical waveguide (1, 2);
   (d) storing successive intensity values of the video signal in the holding unit which intensity values are taken along a slit in a direction (y) which is perpendicular to the line direction (x) at the area of a coordinate position ($x_s$);
   (e) with the processor, converting the stored intensity values ($I_s$) into a slit mean (averaged) intensity signal $I_m(x)$ and storing this signal;
   (f) subsequently forming and storing further slit signals $I_s$ thereby covering an area overlying the end face of the optical waveguide (1, 2); and
   (g) determining the position coordinates ($x_{E1}$, $x_{E2}$) of the end face of the optical waveguides (1, 2) from the variation $I_m(x)$.

2. A method as claimed in claim 1, wherein the position coordinates $x_{E1}$ and $x_{E2}$ of the end faces of neighboring optical waveguides (1, 2) are determined and the processor (7) causes at least one of the optical waveguides to be axially displaced by means of a drive unit in such a way that a nominal distance between the end faces of the optical waveguides (1, 2) results.

3. A method as claimed in claim 1 or 2, wherein the value of the slit signal ($I_s$) increases monotonically with a mean value of the video signal values ($I_m$) stored for a slit.

4. A method as claimed in claim 1, wherein the coordinate ($x_s$) of the slit is determined by the processor (7) via a signal which is time-delayed with respect to the line synchronizing signal of the video signal.

5. A method as claimed in claim 2 wherein the coordinate ($x_s$) of the slit is determined by the processor (7) via a signal which is time-delayed with respect to the line synchronizing signal of the video signal.

6. A method as claimed in claim 3 wherein the coordinate ($x_s$) of the slit is determined by the processor (7) via a signal which is time-delayed with respect to the line synchronizing signal of the video signal.

7. A circuit arrangement for determining the end face position of an optical waveguide (1, 2) in a coordinate direction (x) extending in the axial direction of the optical waveguide (1, 2), which comprises:
- a video camera (9) for recording the end portion of the optical waveguide (1, 2);
- a holding unit (10) for evaluating the video signal of the video camera;
- a processor (7) for evaluating luminance information of the video signal to determine a position coordinate ($x_{E1}$, $x_{E2}$) of the end face of the optical waveguide (1, 2);
- a delay unit (26) for forming slit signals which are delayed with respect to the line synchronizing signals;
- a sample-and-hold stage (27) for holding the values of the video signal of a slit;
- an A/D converter (28) for converting the values of the video signal;
- a memory for storing digitized values of the video signal; and
- a processor (7) comprising a control circuit for initiating detection processes at different coordinate positions (xs) covering an area overlying the end face of the optical waveguide (1, 2) and a computing circuit for determining the position coordinate ($x_{E1}$, $x_{E2}$) of the end face of the optical waveguide (1, 2).

8. An arrangement as claimed in claim 7, wherein the processor (7) comprises a control circuit and a computing circuit for forming control signals for a drive means axially displacing the optical waveguide (1).

9. An arrangement as claimed in claim 8 wherein the drive means is a holder (3).

* * * * *